United States Patent
Davis, Jr. et al.

(10) Patent No.: US 6,942,243 B2
(45) Date of Patent: Sep. 13, 2005

(54) VEHICLE INSTRUMENT PANEL AIR BAG DOOR ASSEMBLY

(75) Inventors: Joseph J. Davis, Jr., Ortonville, MI (US); Gary Sadek, Plymouth, MI (US); Michael J. Hier, Milford Township, MI (US)

(73) Assignee: Lear Corporation, Southfield, MI (US)

( * ) Notice: Subject to any disclaimer, the term of this patent is extended or adjusted under 35 U.S.C. 154(b) by 183 days.

(21) Appl. No.: 10/328,683

(22) Filed: Dec. 23, 2002

(65) Prior Publication Data

US 2004/0119268 A1 Jun. 24, 2004

(51) Int. Cl.$^7$ ............................................ B60R 21/16
(52) U.S. Cl. .................................. 280/728.3; 280/732
(58) Field of Search .............................. 280/728.3, 732

(56) References Cited

U.S. PATENT DOCUMENTS

| | | | | |
|---|---|---|---|---|
| 4,097,064 A | * | 6/1978 | Ikawa et al. ................. | 280/732 |
| 4,989,896 A | * | 2/1991 | DiSalvo et al. .............. | 280/732 |
| 5,035,444 A | | 7/1991 | Carter | |
| 5,108,128 A | * | 4/1992 | Parker et al. ................ | 280/732 |
| 5,154,444 A | * | 10/1992 | Nelson ......................... | 280/732 |
| 5,316,335 A | * | 5/1994 | Gray et al. .................. | 280/728.3 |
| 5,375,875 A | * | 12/1994 | DiSalvo et al. .............. | 280/728.3 |
| 5,375,876 A | * | 12/1994 | Bauer et al. ................. | 280/728.3 |
| 5,433,474 A | * | 7/1995 | Farrington et al. .......... | 280/728.3 |
| 5,533,749 A | * | 7/1996 | Leonard et al. ............. | 280/728.3 |
| 5,590,901 A | * | 1/1997 | MacGregor .................. | 280/728.3 |
| 5,611,564 A | * | 3/1997 | Bauer .......................... | 280/728.3 |
| 5,630,613 A | * | 5/1997 | Leonard et al. ............. | 280/728.3 |
| 5,863,064 A | * | 1/1999 | Rheinlander et al. ........ | 280/732 |
| 5,968,381 A | | 10/1999 | Nusshor | |
| 6,070,901 A | * | 6/2000 | Hazell et al. ................ | 280/728.3 |
| 6,106,003 A | * | 8/2000 | Rahmstorf et al. .......... | 280/728.3 |
| 2002/0050046 A1 | | 5/2002 | Nicholas | |

FOREIGN PATENT DOCUMENTS

| | | | |
|---|---|---|---|
| JP | 4-151345 | * | 5/1992 |
| JP | 7329674 A | | 12/1995 |
| JP | 7-329674 | * | 12/1995 |
| JP | 10226300 A | | 8/1998 |
| JP | 10-226301 | * | 8/1998 |
| JP | 2003-137055 | * | 5/2003 |
| JP | 2003-146170 | * | 5/2003 |
| JP | 2003-154911 | * | 5/2003 |

* cited by examiner

*Primary Examiner*—Paul N. Dickson
*Assistant Examiner*—George D Spisich
(74) *Attorney, Agent, or Firm*—Brooks Kushman P.C.

(57) ABSTRACT

An air bag deployment door mechanism for the instrument panel of an automotive vehicle. A deployment door is molded integral with the instrument panel retainer and defined by a plurality of closely spaced holes about its perimeter. The spacing between the holes define the physical connection between the deployment door and the instrument panel retainer. A tear initiator is molded into the deployment door which is activated by the inflating air bag. The tear initiator pierces the foam and decorative layers prior the severing of the physical connection between the deployment door and the instrument panel retainer.

18 Claims, 2 Drawing Sheets

VEHICLE INSTRUMENT PANEL AIR BAG DOOR ASSEMBLY

BACKGROUND OF THE INVENTION

1. Field of the Invention

The invention is related to air bag deployment doors and, in particular, to an air bag deployment door molded with the molding of an instrument panel retainer and which includes an integral tear initiator.

2. Background Art

Air bag restraint systems are currently being required on all passenger automotive vehicles. These air bag restraint systems are conventionally disposed behind the instrument panel or embedded in the steering wheel. For aesthetic purposes, these air bag systems are disposed behind a cover or protective door which in turn are covered by a foam layer and a decorative cover layer. For rapid deployment of the air bag when activated, it is necessary to tear away the decorative layer and the protective cover. The prior art teaches a wide variety of mechanisms to pierce the decorative layer and provide for the rapid removal of the protective door. In some of these mechanisms, such as taught by Bauer, et al, in U.S. Pat. No. 5,48,106 a separate first inflator is used to activate a mechanism to pierce the decorative or external layer of the instrument panel and a second inflation to inflate the air bag. Other mechanisms such as taught by Parker et al. in U.S. Pat. No. 5,108,128 discloses a cutter mechanism displaced by the inflating air bag to cut through the foam layer and external layer of the instrument panel. In other patents such as taught by Ohmija in U.S. Pat. No. 6,250,669 the severing of the cover layer by a sharp edge of the door as it is forced open by the inflating air bag is disclosed. Still in other mechanisms as taught by Vavalidis in U.S. Pat. No. 5,772,240 protrusions attached to the cover pierce the external layers.

These mechanisms have been found to work well however there is always room for improvement. The instant invention is directed to improvements which make the deployment of the air bag quicker, is less complex, has the potential to reduce deployment time and the potential to reduce the size of the inflator.

SUMMARY OF THE INVENTION

A deployment door mechanism for an automotive vehicle air bag system having a door which is molded integral with the instrument panel retainer. A series of closely spaced holes define the periphery of the deployment door. The spacings of these holes determine the degree of physical connection between the deployment door and the instrument panel retainer such that the door will break free from the instrument panel retainer upon the application of a predetermined force by the inflating air bag. Further, molded into the deployment door is a tear initiator. The tear initiator has a base end attached to the deployment door, a free end, and an actuator portion disposed between the base end and the free end. The free end terminates in a sharp piercing portion at a location adjacent to one edge of the deployment door. The tear initiator is pivotably connected to the door which permits it to be pivoted causing the sharp piercing portion to pierce through the foam layer overlaying the instrument panel retainer and the protective layer overlaying the deployment door. As a result, the tearing of the foam layer and the decorative layer is accomplished prior to the deployment door being severed from the instrument panel retainer.

One object of the deployment door mechanism is to provide for a faster removal of the deployment door upon inflation of the air bag.

Another object of the deployment door mechanism is to pierce the foam layer and the protective cover prior to severing of the deployment door from the instrument panel retainer.

Another object of the deployment door mechanism is to reduce the number of parts and assembly time.

Still another object of the deployment door mechanism is that the door is defined by laser-scoring a plurality of closely spaced holes about the periphery of the door.

And yet it is another object of the deployment door mechanism is a reduction in the size of the inflator required to deploy the air bag.

These and other objects of the invention will become apparent from a reading of the detailed description of the preferred embodiment in conjunction with the drawings.

DETAILED DESCRIPTION OF THE PREFERRED EMBODIMENT(S)

Figure 1:
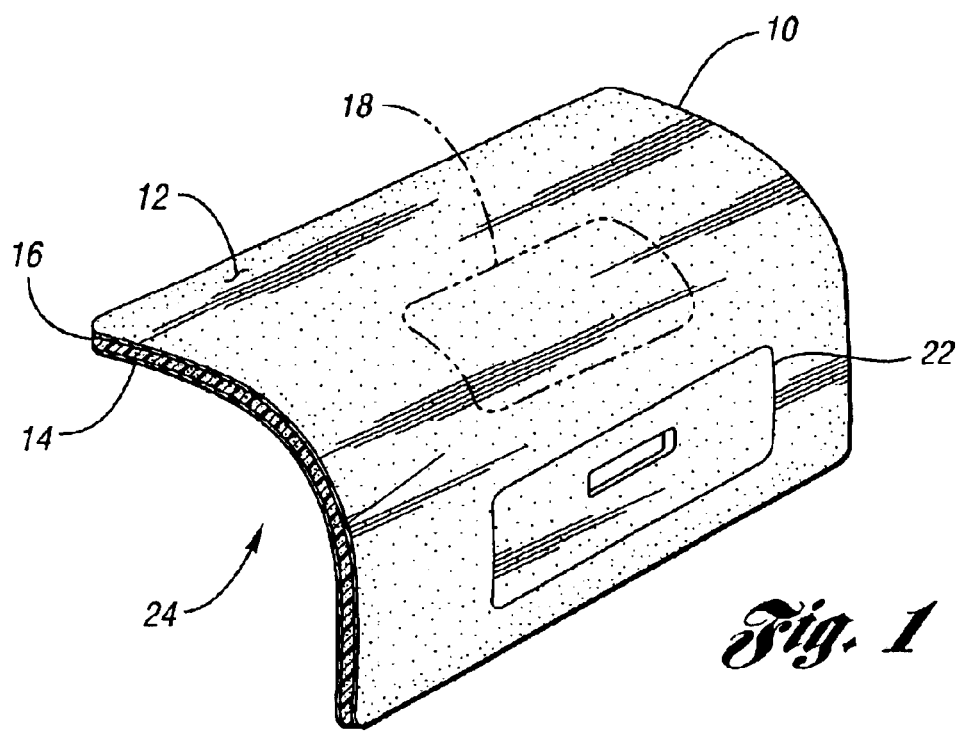
FIG. 1 is a perspective showing a portion of an automotive vehicle instrument panel.

FIG. 1 is a perspective of a portion of an instrument panel 10 of an automotive vehicle. In the illustrated embodiment, only the passenger side of the instrument panel 10 is shown. The instrument panel is of a conventional laminated construction having a non-rigid external layer 12 overlaying a rigid instrument panel retainer 14. A foam layer 16, such as a urethane layer is interposed the external layer 12 and the instrument panel retainer 14. This foam layer 16 is from 4 to 6 millimeters thick. The external layer 12 is normally a decorative layer and is most commonly a vinyl or similar material. The external layers 12 faces the interior of the vehicle's passenger compartment and may include a tear seam in the region of an air bag deployment door. The instrument panel retainer 14 is preferably a molded engineering grade structural plastic component.

Located behind the instrument panel 10 is an air bag mechanism (not shown) which is activated by an impact sensor in a conventional manner. The air bag mechanism includes a deployment door 20, the outline of which is shown by the phantom line 18 in FIG. 1. As is more clearly shown in FIG. 3, the deployment door 20 is located below the external layer 12 and the foam layer 16. The instrument panel 10 may also include a glove box as indicated by glove box door 22.

Figure 2:
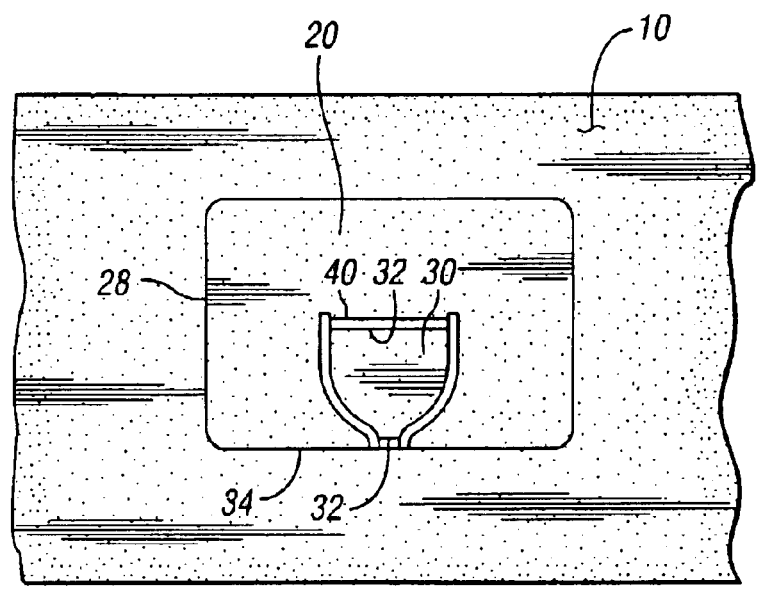
FIG. 2 is a bottom view of the instrument panel.
Figure 3:
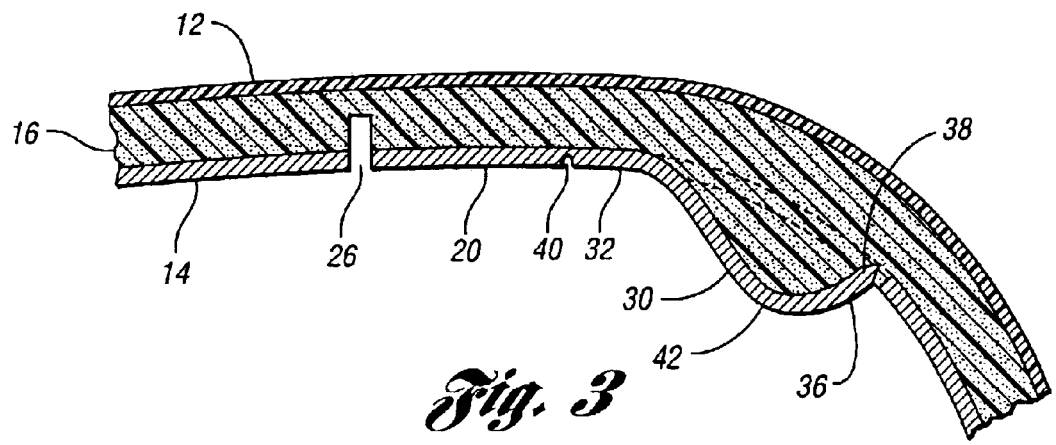
FIG. 3 is a cross-sectional view of the deployment door mechanism in the pre-activated state.
Figure 4:
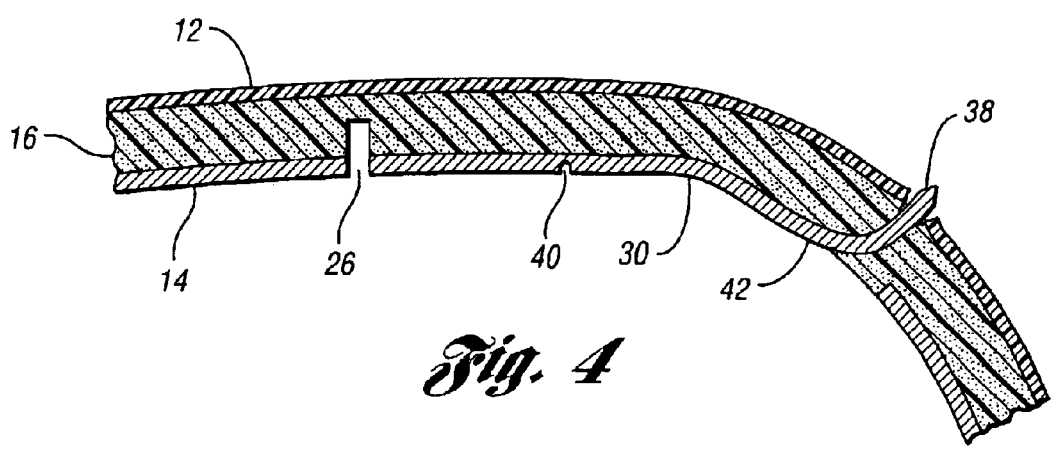
FIG. 4 is a cross-sectional view of the deployment door mechanism with the tear initiator activated.

FIG. 2 is a bottom view of the instrument panel retainer 14 taken in the direction of arrow 24 in FIG. 1. Referring to FIGS. 2, 3, and 4, the deployment door 20 is formed integral with the retainer 14 but is separable therefrom. The door 20 is effectively a breakaway door. The deployment door 20 is weakly attached to the retainer 14 such that when a sufficient force is applied by an inflating air bag, the physical connection between the deployment door 20 and the instrument panel retainer 14 is severed. This breakaway capability of the deployment door 20 is achieved by laser scoring about the periphery of the deployment door a series of closely spaced holes 26 through the instrument panel retainer 14 and part way through the foam layer 16. The depth of the holes 26 is terminated at a location 0.2 to 0.4 millimeters below the external layer 12, as shown in FIG. 3. Using this procedure, the location of the deployment door 20 is not perceptible when viewed from the vehicle's passenger compartment. The series of holes 26 is illustrated by lines 28 in FIG. 2 outlining the shape of the door 20 in FIG. 2.

Figure 5:
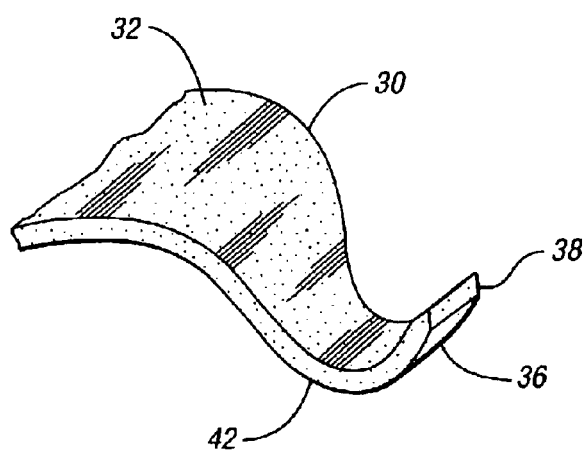
FIG. 5 is a perspective view of the tear initiator.

Formed integral with the deployment door 20 is a tear initiator 30. The tear initiator 30 has a base portion 32 attached to the door 20 at a location offset from the lower edge 34. The tear initiator 30 has a free end 36 which is adjacent to lower edge 34. The free end 36 has a pointed pressing portion 38 which is from 2 to 5 millimeters wide as shown in FIG. 5. The base portion 32 is flexibly attached to the deployment door 20 permitting the tear initiator 30 to have independent flexibility relative to the door 20. This flexibility is achieved by providing a transverse groove 40 at the location where the tear indicator 30 is attached to the deployment door 20. This groove 40 may be formed when the instrument panel retainer 14 is molded or it may be laser scored.

Referring to FIGS. 3, 4, and 5, the center portion of the tear initiator 30 is a bowed portion 42 bowed inwardly away from the external layer 12 and protrudes into the air bag housing. This bowed portion 42 of the tear initiator 30 is contacted by the inflating air bag prior to applying pressure to the inner surface of the deployment door 20. In response to the inflation of the air bag, this bowed portion assures the tear initiator 20 is pivoted outwardly and the pointed piercing portion 38 cuts through the foam layer 16 and pierces the exterior layer 12, as shown in FIG. 4. This occurs prior to the pressure asserted by the air bag applied to the deployment door 20 being sufficient to break away the deployment door 20 from the instrument panel retainer. Once the external layer 12 is pierced, the external layer is easily torn the rest of the way by the break-away deployment door 20.

For safety of the passengers, the pointed piercing portion 38 in the pre-activated state of the tear initiator is located below the outer surface of the instrument panel retainer 14 as shown in FIG. 3. This prevents injury to a passenger in the event of force able, accidental head contact with the instrument panel 10.

The deployment door 20 and the tear initiator 30 are molded in the instrument panel retainer 14 and therefore no additional parts or assembly is required. It also has been found that the tear initiator 30 requires less effort to tear the external layer 12 upon inflation of the air bag and as a result, a smaller inflator can be used. It also has been found that the tear initiator reduces deployment time of the air bag.

While one embodiment of the invention have been illustrated and described, it is not intended that this embodiment illustrate and describe all possible forms of the invention. Rather, the words used in the specification are words of description rather than limitation, and it is understood that various changes may be made without departing from the spirit and scope of the invention.

What is claimed is:

1. An instrument panel air bag deployment door mechanism for a vehicle comprising:
   a molded plastic instrument panel retainer having an internal surface adjacent to which an air bag is stored prior to deployment and an outer surface that faces the passenger compartment of the vehicle;
   a foam layer disposed on the outer surface of the instrument panel retainer;
   a pliant external layer overlaying the foam layer;
   a deployment door molded integral with the instrument panel retainer, the deployment door having a physical attachment of a selected strength to the remainder of the instrument panel retainer so that the physical connection between the deployment door and the instrument panel retainer is severed upon the application of sufficient force from an inflating air bag; and
   a tear initiator molded integral with the molding of the deployment door, the tear initiator having a base flexibly attached to the deployment door and a free end adjacent to one edge of the deployment door, the free end having a pointed piercing in portion that extends normally towards the external layer, the tear initiator further having an actuator portion that protrudes towards a stored air bag such that an inflating air bag contacts the actuator portion and pivots the tear initiator causing the pointed piercing portion to pierce through the foam layer and the external layer prior to severing the physical connection between the deployment door and the instrument panel retainer, wherein a groove is provided at the base of the tear initiator to facilitate flexing of the tear initiator relative to the deployment door.

2. The deployment door mechanism of claim 1 wherein the perimeter of the displacement door is defined by a series of holes through the instrument panel retainer, the spacing of the holes controlling the force required to sever the deployment door from the instrument panel retainer.

3. The deployment door mechanism of claim 2 wherein the holes through the instrument panel retainer are laser-scored holes.

4. The deployment door mechanism of claim 3 wherein the laser-scored holes further extend part way through the foam layer.

5. The deployment door mechanism of claim 4 wherein the depth of the laser-scored holes through the foam layer extends to within 0.2 to 0.4 millimeters of the external layer.

6. The deployment door mechanism of claim 1 wherein the groove at the base of the tear initiator is a laser-scored groove.

7. The deployment door of claim 1 wherein the pointed piercing portion of the tear initiator lies below the outer surface of the instrument panel retainer.

8. The deployment door mechanism of claim 7 wherein the pointed piercing portion is 2.0 to 5.0 millimeters wide.

9. The deployment door mechanism of claim 7 wherein the actuator portion is a portion of the tear initiator intermediate the base and the free end that is bowed away from the foam layer and the external layer.

10. The deployment door mechanism of claim 1 wherein the external layer is a decorative layer.

11. The deployment door mechanism of claim 1 wherein the foam layer is from 4 to 6 millimeters thick.

12. A method for making an instrument panel retainer having an integral deployment door mechanism comprising:
   molding an instrument panel retainer having an inside surface and an outside surface;
   providing a series of closely spaced holes through the instrument panel retainer to define the perimeter of a deployment door;
   molding with the instrument panel retainer a tear initiator, the tear initiator having a base end attached to the door, a free end, and an actuator portion, the free end having a sharp piercing portion adjacent to one edge of the deployment door, the sharp piercing portion extending to the outside surface of the molded instrument panel retainer; and providing a groove at the base end of the tear initiator to form a hinge permitting the tear initiator to independently flex relative to the deployment door.

13. The method of claim 12 wherein the series of closely spaced holes are provided by laser-scoring the instrument panel retainer.

14. The method of claim 13 wherein the molding of the tear initiator comprises molding a bowed portion intermediate the base end and the free end, the bowed portion protruding away from the inside surface of the instrument panel retainer to form the actuator portion.

15. The method of claim 13 wherein the sharp piercing portion is molded to lie below the adjacent outside surface of the instrument panel retainer.

16. The method of claim 13 wherein the sharp piercing portion is molded to a width from 2.0 to 5.0 millimeters.

17. The method of claim 12 further comprising:
applying a foam layer over the outside surface of the instrument panel retainer;
applying a decorative exterior layer on the foam layer; and
wherein the holes are laser-scored through the instrument panel retainer and part way through the foam layer.

18. The method of claim 17 wherein the laser-scoring scores the holes in the foam layer to a depth within 0.2 to 0.4 millimeters from the exterior layer.

* * * * *